United States Patent [19]

Ahlen et al.

[11] 4,176,564
[45] Dec. 4, 1979

[54] CONTROL ARRANGEMENT FOR VARIABLE POWER TRANSMISSION

[75] Inventors: Karl G. Ahlen, Bromma; Per-Olof Bergstrom, Ektorp; Joseph Supanich, Stockholm, all of Sweden

[73] Assignee: S.R.M. Hydromekanik Aktiebolg, Stockholm-Vallingby, Sweden

[21] Appl. No.: 729,422

[22] Filed: Oct. 4, 1976

[30] Foreign Application Priority Data

Jan. 29, 1976 [DE] Fed. Rep. of Germany ....... 2621447
May 26, 1976 [GB] United Kingdom ............... 03527/76

[51] Int. Cl.² ...................... F16H 47/00; F16H 57/10
[52] U.S. Cl. ...................................... 74/732; 74/753; 74/730
[58] Field of Search ................. 74/730, 732, 364, 753, 74/760, 761, 731, 733

[56] References Cited

U.S. PATENT DOCUMENTS

| | | | |
|---|---|---|---|
| 2,835,136 | 5/1958 | Berthiez | 74/364 X |
| 2,974,766 | 3/1961 | Perkins et al. | 74/364 X |
| 3,857,303 | 12/1974 | Mouttet | 74/761 |
| 3,874,254 | 4/1975 | Ahlen | 74/753 X |
| 3,893,551 | 7/1975 | Ahlen | 74/732 X |
| 3,972,246 | 8/1976 | Link | 74/364 X |

Primary Examiner—Lance Chandler
Attorney, Agent, or Firm—Larson, Taylor and Hinds

[57] ABSTRACT

In a multi-speed planetary gear including a planet gear carrier connected to one of the primary or secondary shafts, planet gears mounted thereon, each including at least two gear sections at different diameters and at least three annular gears, i.e. sun or ring gears engaging said gear section, each of the annular gears including a friction coupling for fixing the same relative to the casing, and a servo-motor non-rotatatively mounted in the casing for controlling each of the friction couplings. A multi-position control valve controls the flow of pressurized fluid separately to each of the servo-motors. A low capacity high pressure pump delivers pressurized fluid to the control valve and a non-return valve connected in parallel with the low capacity high pressure pump opens when the servo-motor is filled. A torque converter, preferably of the releasable bladed component type may be included between the vehicle motor and the planetary gear, and in that case a control device for controlling the position of the releasable member can be operable in response to movement of the control valve.

19 Claims, 12 Drawing Figures

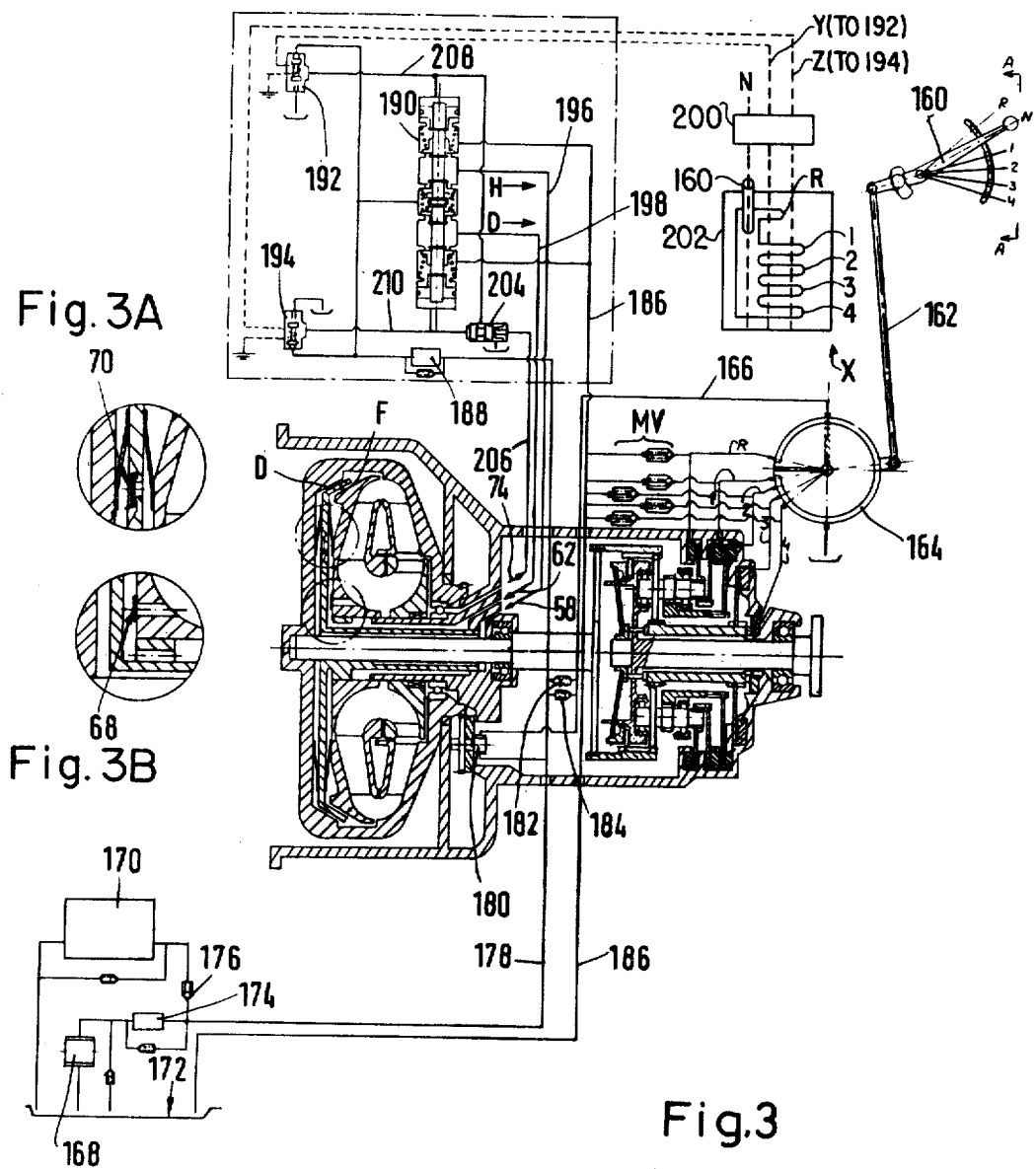

CONTROL ARRANGEMENT FOR VARIABLE POWER TRANSMISSION

The invention relates to a variable power transmission device for motor vehicles fitted with a multi-stage mechanical gear change.

Conventionally such power transmission devices include speed-change gear wheels in the form of pinion gears and, in order to change gears, clutch couplings associated with the pinion gears are actuated under the control of a gear selector lever, via a mechanical linkage. The use of synchronization devices for the clutch couplings has certainly rendered unnecessary laborious double-declutching when changing down through the gears. However, to achieve synchronization of the clutch couplings, the drive connections need a certain amount of "gear-change time" and if a driver disregards the "gear-change time" and "crashes through" the gears, the inevitable result will be not only rapid wear of the gears and synchronization device, but also early failure or breakdown of the gears and the device.

In the case of vehicle transmissions used in conjunction with hydrodynamic torque converters, compound gear boxes are known which are constructed as planetary gears, assembled from several sets of epicyclic gears. In such a transmission, changing from one speed to another is carried out with the aid of servo-actuated brakes and/or couplings by means of which one of three drive elements is stopped or separate drive elements connected together. In order to obtain a sufficient number of gear stages, which is particularly important for heavy trucks and buses and even more important for earth-moving vehicles, this type of compound gearing is very expensive and cumbersome due to the number of gear sets required. Further, for satisfactory operation of gear changes compound gearing requires complicated controls which increase the likelihood of breakdown, and also requires considerable "gear-change time". In addition, fluid pumps with high output are necessary for the controls because motors incorporated in such transmissions generally operate with rotary seals which do not allow high pressures to be used and which possess inherent high losses due to leakage.

It is therefore, an object of the present invention to create a power transmission device for vehicles fitted with a multi-stage mechanical gear-change which can be used both in conventional manner without a torque converter and also in conjunction with a torque converter, with simple and reliable construction and the least possible loss, and which allows the shortest possible "gear-change time" both when changing up and when changing down through the gears.

According to the present invention there is provided: A variable power transmission device for motor vehicles fitted with a multi-stage mechanical gear change wherein the gear change includes planetary gearing with at least two epicyclic gear sections of different diameters and with associated drive components which can be frictionally braked or coupled into a drive line, each brake or coupling having an associated servomotor for actuating the same and each servo-motor having a non-rotatable housing, a multi-position control valve in circuit with a pressure fluid system for selectively controlling operation of individual brakes and couplings and a low capacity high pressure pump for holding the brakes, and couplings, the low capacity high pressure pump being connected in circuit between the fluid system and the control valve and a non-return valve which is connected in parallel with the low-capacity high pressure pump and which opens when a servo-motor is filled.

The use of a planetary gear according to the invention and including at least two epicyclic gear sections of different diameter and associated drive components which can be frictionally braked and/or coupled (for which all braking and coupling is actuated using servo-motors having non-rotatable housings) enables a transmission to be made having comparatively small overall dimensions. Furthermore, the use of non-rotatable housings considerably reduces sealing problems in the servo motors thereby reducing, if not eliminating, the usual leakage losses. This invention has an advantage in that it allows the servo motors to be connected through a selectively opening multi-position control valve to an existing pressure fluid system (such as, the lubricating medium system of the drive motor or the filling pump of a hydrodynamic torque converter) which supplies only that quantity of pressure fluid which is required to fill the servo motor which is connected at any particular time, whereas a supplementary high pressure pump produces the holding pressure necessary for the satisfactory engagement of the friction-contact brakes and couplings after the filling process. In this respect the non-return valve which is connected is parallel with the high pressure pump, automatically controls the amount of pressure fluid required to fill the servo motors, in that it opens against a counter pressure which remains low during filling and after filling, shuts off the back-flow of the servo motors which are provided with the holding pressure by the high pressure pump. Thus, owing to the use of non-rotatable servo motors and the consequent easily solved sealing problems permitting low capacity servo motors to be used, the high pressure pump need only compensate for small leakage losses. It will, therefore, be appreciated that in this way a power transmission device is created which is of simple construction and of compact dimensions and which can be used to advantage both in vehicles without automatic transmission and with automatic transmissions, in particular with a hydrodynamic torque converter operating without steps. Further, the pressure fluid control of the gear change device according to the invention permits location thereof in many different positions and at the same time allows a manufacturer considerable freedom for the construction of the control itself, irrespective of whether the selection of the speeds is carried out by hand or depending on different parameters of the power transmission device, such as the ratio between the number of revolutions of the drive input shaft and that of the output shaft, the turning moment requirement or some other parameter.

It is a feature of this invention that each servo motor is connected to a pressure-free return duct via its own maximum pressure valve which is pre-set to operate at its own individual and characteristic opening pressure. This feature allows the establishment of the connecting pressure on the one hand and holding pressure on the other hand of each of the servo motors to be maintained at an optimum value even with the use of a common hydraulic system and a common high-pressure holding pump for all the servo motors. This facility can be further improved by incorporating means for individually adjusting the opening pressure of the maximum pressure valves. Due to the small capacity of the high pressure holding pump, the removal of small amounts of fluid is sufficient for effective pressure limitation so that the maximum pressure valves can be constructed correspondingly small.

In many cases, the use of planetary gears with drive components which can be frictionally braked and/or coupled, the use of a traditional separating coupling can be eliminated since the function thereof has been assumed by the individual brakes and couplings. In many instances, however, it may be desirable for the brakes and couplings of the planetary gears to be connected without a load for which, according to another feature of the invention, a separating coupling is included in a known way between the drive motor and the planetary gears.

As has already been mentioned, the invention can be applied advantageously to conventional power transmission devices with the exclusion of a multi-stage mechanical gear changing device. However, it is a particular feature of the invention that the planetary gear of the invention is used in conjunction with a hydrodynamic torque converter and in such a case the torque converter is arranged between the drive motor and the planetary gear. In such a case, it may be desirable to connect the brakes and coupling of the planetary gears when the former are not under load and this may be achieved using a separating coupling disposed outside the planetary gears. However, it is particularly advantageous if the torque converter has a releasable torque transmitting bladed component (e.g. pump or turbine) which transmits the moment and forms the actual separating coupling.

This releasable pump or turbine component can be connected or released from an associated shaft in a known way by reversing the flow of the hydraulic fluid through the torroidal-shaped working chamber of the torque converter chamber via a friction coupling. In order to disconnect the converter under normal driving conditions, an additional direct drive coupling can be provided for by-passing the converter and coupled expediently to a release device for the torque-transmitting bladed component in such a way that the torque converter is made inoperative when the direct drive coupling is imposed, i.e. the circulation of fluid in the torroidal-shaped converter chamber is brought to a standstill. This can also be achieved by releasing the torque-transmitting bladed component of the converter at the desired rotation when the direct coupling is connected.

As already mentioned, the power transmission device according to the invention is suitable for vehicles without automatic transmission, in which therefore the changing gear is controlled manually. In such cases, and according to another feature of the invention, the multi-position control valve can be manually operated by means of a lever which runs in a slideway, which preferably includes a neutral position track with finger-shaped tracks branching out from it for the individual connecting positions of the mechanical gear changing device. If desired and, in conjunction with an additional separating coupling (which may be in the form of a separate coupling or a releasable converter impeller component), the lever can further be fitted with a connecting device for operating the separating coupling in such a way that this opens when the lever is in the neutral position track. This arrangement can be still further improved when used in conjunction with a hydrodynamic torque converter which can be by-passed by a direct drive coupling by connecting in hydraulic drive over part of the finger-shaped tracks adjoining the neutral position track, and by connecting in direct drive over at least part of these tracks in the subsequent terminal area. In this arrangement, the positive connection of the hydrodynamic torque converter at each gear change results in a smooth speed change without the hydrodynamic torque converter remaining disconnected for any length of time and thereby reducing the operational effectiveness.

In a power transmission device fitted with a manually operated gear change it may also be desirable, for the optimum exploitation of the efficiency of the engine, to carry out automatic changes between two adjacent gears according to the prevailing driving conditions. This can be achieved by connecting a change-over valve to an outlet of the multi-position control valve, the change-over valve serving to automatically change gears between at least the two highest gear positions under certain driving conditions.

The invention will now be described by way of example with reference to the accompanying drawings in which.

Figure 1:
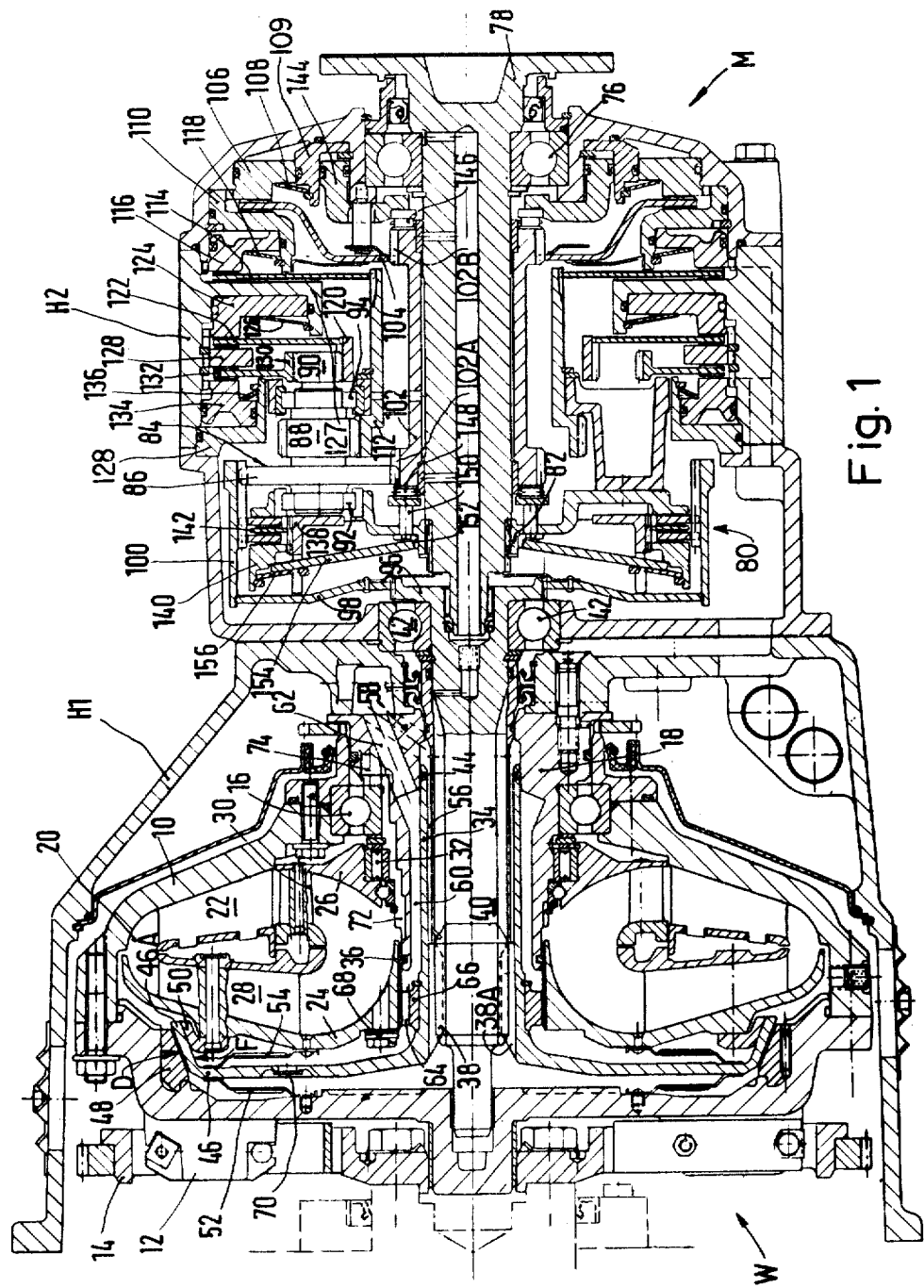
FIG. 1 is an axial section through a drive connection used in a first embodiment of the invention, showing a one and a half stage hydrodynamic torque converter connected to a planetary gearing.
Figures 4, 4A, 4B:
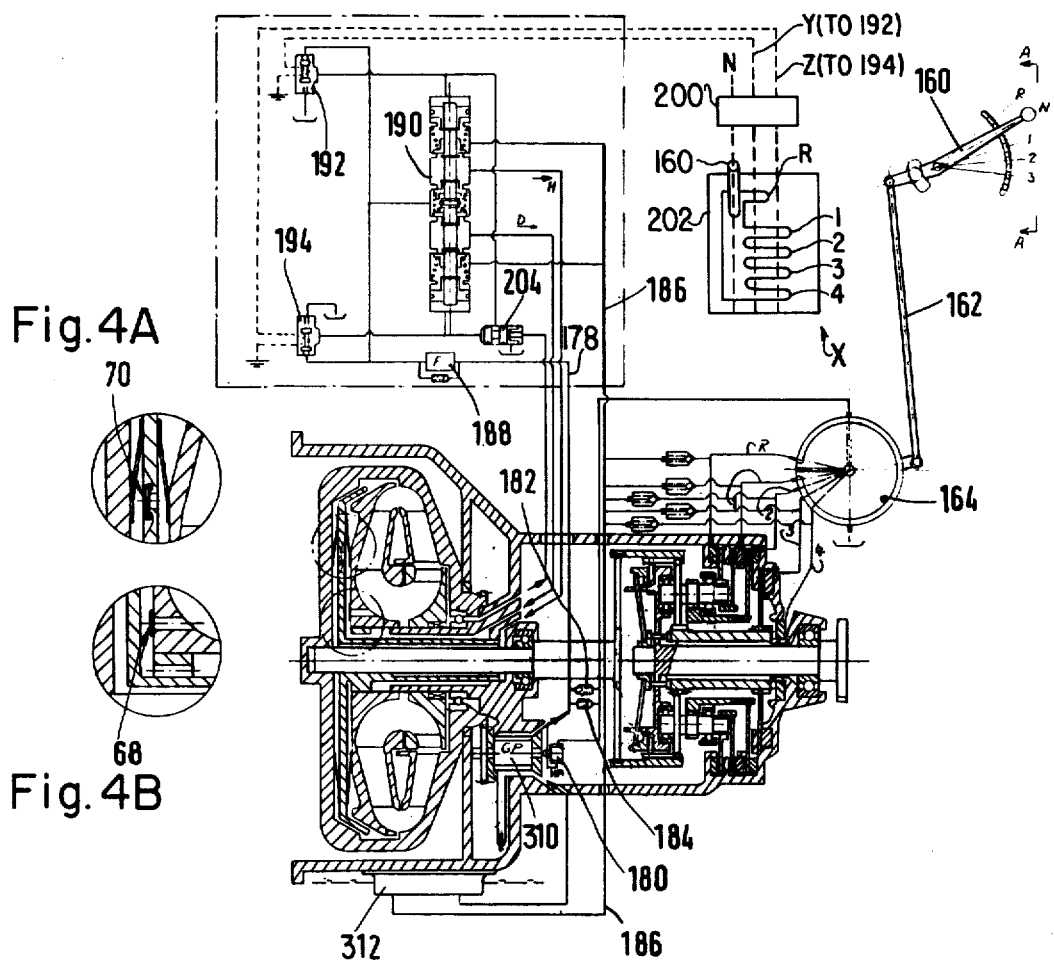
Figure 5A:
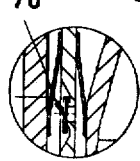
Figure 5B:
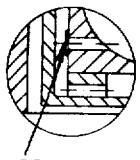
Figure 5:
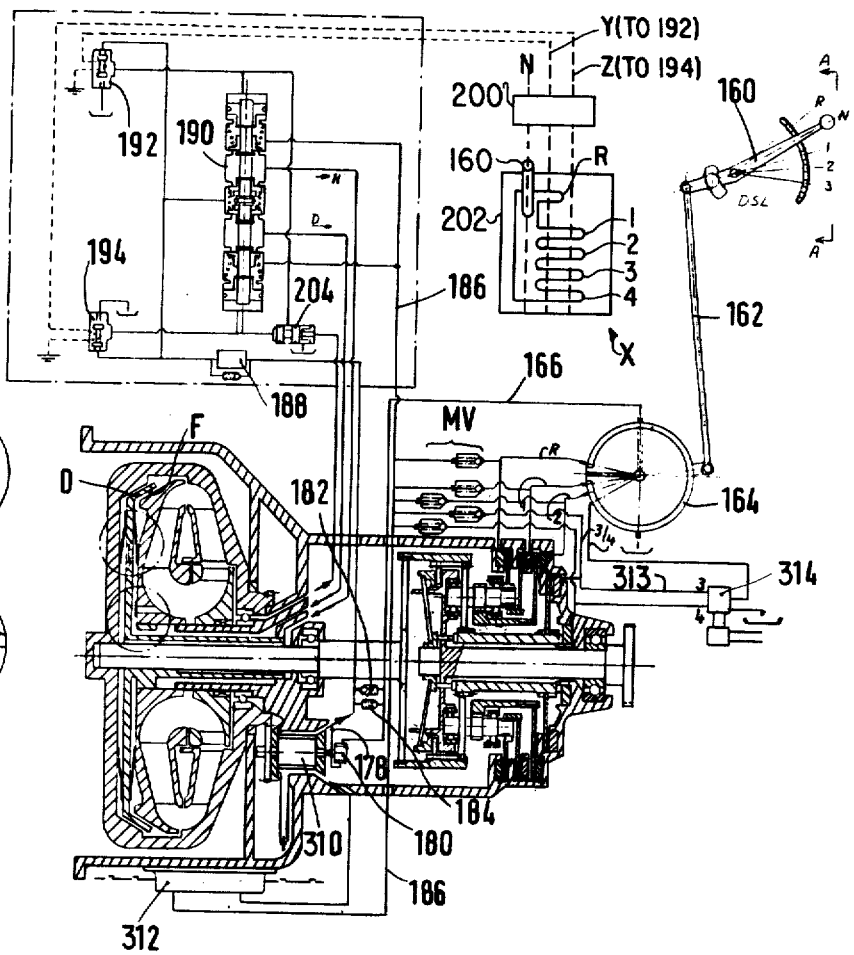

FIG. 3 shows the drive connection of FIG. 1 in simplified form with a hydraulic connecting device for selectively connecting individual servo motors for the coupling and braking, both for hydraulic drive and direct drive of the hydrodynamic torque converter, and in this simplification of the invention, the basic pressure for the control fluid is supplied by the lubricating oil system of the internal combustion engine;

FIG. 4 is a modified version of the control system of FIG. 3;

FIG. 5 shows a further modification of the control system of FIG. 3, and

Figure 6:
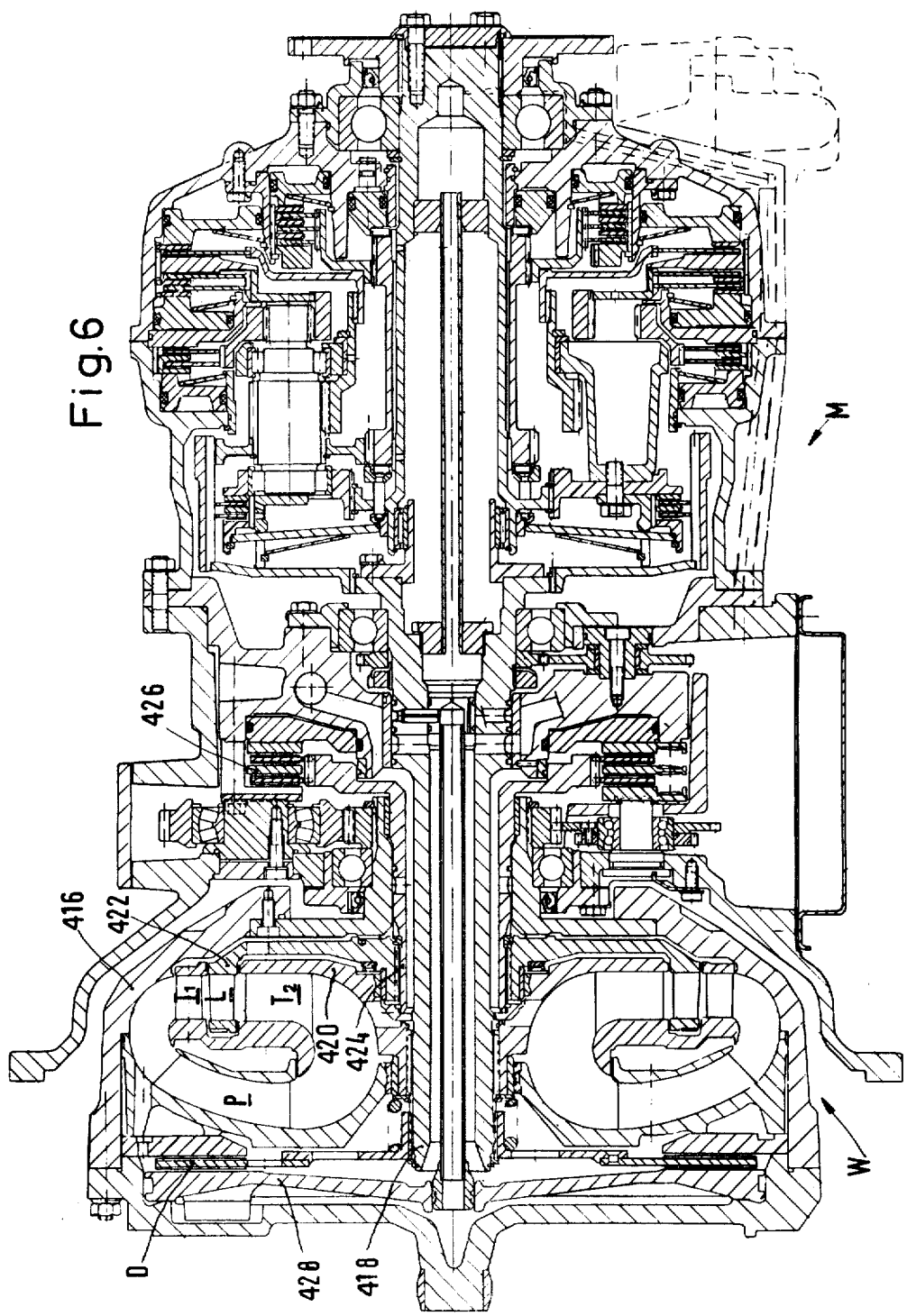

In each of FIGS. 3, 4, and 5, enlarged portions are shown to the left and designated for each of FIGS. 3–5, 3A and 3B, 4A and 4B, 5A and 5B, respectively;

FIG. 6 is an axial section taken through a drive connection suitable for heavy vehicles and including a two-stage hydrodynamic torque converter and a planetary gearing.

The drive connection shown in FIG. 1 has a converter part W and a mechanical drive part M, which are enclosed by stationary housings $H_1$ and $H_2$ respectively, and which are rigidly connected to each other. In this description "front" shall mean towards the left in FIG. 1 and "rear" towards the right therein.

The housing $H_1$ contains a one and a half stage hydrodynamic torque converter with a rotatable converter casing 10 which can be driven via a coupling 12 by the flywheel 14 of a vehicle engine (not shown), particularly a diesel engine, and is mounted at the rear end in a bearing 16 on a hollow shaft 18. The converter casing 10 defines a part of the circumferentially outer boundary of a torroidal-shaped working chamber 20 and supports a ring of pump blades 22. The outer boundary of the torroidal-shaped working chamber 20 is completed by a turbine wheel 24 which carries a ring of turbine blades 28 and a guide or reaction wheel 26 which carries a ring of guide blades 30.

The guide wheel 26 is mounted on the hollow shaft 18 via a freewheel 32 in such a way that the guide wheel 26 can only rotate in the same direction as the converter casing 10. The turbine wheel 24 is rotatably mounted on a hollow shaft 34 and is sealed relative to the hollow shaft 18 by a sealing ring 36. The hollow shaft 34 carried on a main drive shaft 40 by a spline connection 38 with the splines on the shaft 34 machined to include a plurality of circumferentially extending grooves 38A. The drive shaft 40 is mounted at the front end in the converter casing at 10A and at the rear end in the housings $H_1$, $H_2$ by means of a ball bearing 42.

The hollow shaft 34 is mounted for axial movement in the central main drive shaft 40 and in the turbine wheel 24 and it is sealed during axial movement by a seal 44 located at the rear end of the hollow shaft 18. At its front end, the hollow shaft 34 carries a friction disc 46 having a conical outer flange 46A, the outer peripheral face serving to co-operate with a conical insert 48 on casing 10 and the inner peripheral face thereof serving to co-operate with a conical ring 50 on the turbine wheel 24. The conical ring 50 and the friction disc 46/46A together forms a coupling F between the turbine wheel 24 and main drive shaft 40, by which the ring of turbine blades 28 can be connected to or released from the main drive shaft 40. Further, with the conical insert 48 the friction disc 46/46A forms a direct coupling D between the converter casing 10 and the main drive shaft 40 when the hydrodynamic torque converter revolves. Leaf springs 52, 54 carried by the converter casing 10 or on the turbine wheel 24 respectively normally serve to centralise the flange 46A between the conical insert 48 and the conical ring 50 and thus keep both couplings F & D disengaged. The setting up of the couplings F & D is achieved by control of the flow of fluid into and out of the torroidal-shaped working chamber 20. For this purpose, between the hollow shaft 34 and and the central main drive shaft 40 there is a pressure fluid channel 56 through which converter fluid under pressure can be supplied by a filling system (not shown in FIG. 1), via a transverse supply bore 58 and through to the front side (i.e. left hand side as viewed of FIG. 1) of friction disc 46. In a similar way, between the hollow shaft 34 and the hollow shaft 18 a channel 60 connects a supply bore 62 from which converter fluid under pressure can be introduced via the axial passages 64 in bearing 66, between the hollow shaft 34 and the turbine wheel 24 to the rear side (i.e. right hand side as viewed in FIG. 1) of the friction disc 46. In the turbine wheel 24 there is a first maximum pressure valve 68 which opens into the space formed between the turbine wheel 24 and the friction disc 46 when a certain pressure is reached in the converter chamber 20.

A second maximum pressure valve 70 is located in the friction disc 46 and opens when a certain pressure is reached in the space between the turbine wheel 24 and the friction disc 46, this space being then connected to the channel 56. The hollow shaft 18 has on its outer side a channel 72 through which the torroidal-shaped working chamber 20 can be connected to a supply 74.

It will be understood that when fluid under pressure is introduced through the supply bore 58 and the channel 56 to the front side of the friction disc 46, a pressure force will be exerted which presses disc 46 against the turbine wheel 24 and thus engages the coupling F. When this coupling F engages, the pressure fluid is prevented from directly flowing into the space between the converter disc 46 and the turbine wheel 24. The pressure fluid which is supplied thus flows around the periphery of the turbine wheel 24 into the working chamber 20, increases the pressure in the working chamber and opens the maximum pressure valve 68, so that the converter fluid returns through the channel 60 and the supply bore 62 to a valve of the pressure fluid system which will be later described. If, on the other hand, the pressure fluid is passed through the supply bore 62 and the channel 60 into the space between the disc and the turbine wheel 24, it exerts a pressure on the rear side of the friction disc 46 and, by moving the friction disc 46, forces the direct drive coupling D into engagement. Since in this instance the pressure fluid is prevented from flowing away over the flange 46A of the friction disc 46 into the space between the disc 46 and the converter casing 10 and onwards to the channel 56 and the supply bore 58, the maximum pressure valve 70 opens when the necessary pressure has been reached. In this way the valve 70 allows the pressure fluid to flow away while at the same time maintaining an adequate pressure difference between the two sides of the friction disc 46.

The housing $H_2$ is supported in a ball bearing 76 at the rear end of a drive shaft 78, the front end of which is mounted in an axial bore formed in the central main drive shaft 40. A two part epicyclic gear unit 80 is rotationally fixed to the drive shaft 78 at 82, and bears a number of epicyclic gears 84, of which only one is visible in the plane of the section shown in FIG. 1. Each epicyclic gear 84 has three planet gears 86, 88, 90 with different diameters and is mounted with roller bearings 92, 94 outside the largest planet gear 86 or between the planet gears 88, 90 in the two-part epicyclic unit 80. The ring and sun gears, to be described below, may be referred to generically as "annular gears".

A flange 96 on the end of the main drive shaft 40 is connected by a spline connection to a drive flange 98 which is rotationally fixedly connected to cylindrical ring gear 100 which meshes with the largest planet gear 86 of the epicyclic gear unit 80. A cylindrical sun gear 102 is rotatably and axially movable mounted on the drive shaft 78 and has sun gear rings 102A, 102B at its ends as shown. The ring gear 102A meshes at the front end with the largest planet gear 86 of the epicyclic gears 84 and gear ring 102B meshes at the rear end with a friction disc 104. The friction disc 104 can be braked by a servo motor piston 106, which is movable in the housing $H_2$, against the force of a plate spring 108 carried by a fixed housing insert 109. The epicyclic unit 80 has a further cylindrical sun gear 112 which is mounted to mesh at its front end with the middle planet gear 88 of the epicyclic gears and, at its rear end, is rotationally fixed to a friction disc 114, which can be firmly braked by a servo-motor piston 116 against the effect of a plate spring 118 carried by the above-mentioned housing insert 110. A third sun gear 120 meshes over the greater part of its length with the smallest planet gear 90 of the epicyclic gears 84 and is connected at its rear end to a friction disc 122 which can be braked by a servo-motor piston 124 against the effect of a plate spring 126 supported on an extension 127 of the housing $H_2$. Finally, a further ring gear 130 meshes radially outwardly with the smallest planet gear 90 of the epicyclic gears 84. The ring gear 130 is formed integrally with a friction disc 132 which can be firmly braked by a servo-motor piston 134 against the effect of a plate spring 136 on a housing insert 128.

The epicyclic unit 80 has an annular member 138 on which a pressure ring 140 of a disc clutch 142 can be moved between ring gear 100 and the epicyclic unit 80. In this unit 80, gear 100 is the drive annular gear. For engagement of the clutch 142, there is a servo-motor piston 144 which is located in the rear area of the houding part H₂ and which acts via a first needle bearing 146 on the axially movable sun gear 102 and a second needle bearing 148, together with push rod 150 acting on a movable pressure ring 152 on the hub of the epicyclic unit 80. When moved to the left the pressure ring 152 engages a number of radially extending levers 154 which are pivotally mounted on the annular member 138 of the epicyclic unit 80 outside its center. The outer ends of the levers 154 engage the pressure ring 140 for the operation of the disc clutch 142. A plate spring 156 located in the region of the outer ends of the levers 154 is stressed to bias the levers 154 into the disengaged direction of the clutch 142 so that, when the servo-motor piston 144 is not actuated, the clutch 142 is disengaged and, at the same time, the needle bearings 146, 148 remain axially loaded.

It is apparent that upon engagement of the disc clutch 142 by setting the servo-motor piston 144 under pressure, a direct connection of the main drive shaft 40 and the drive shaft 78 is achieved and this corresponds to the fourth gear of the mechanical drive part M formed by the epicyclic gears. Apart from this direction gear, a first gear, with the greatest step-down in the gearing, can be connected by braking the sun gear 120 with the aid of the servo-motor 124, a second gear can be connected by braking the sun gear 112 with the aid of the servo-motor 116 and a third gear can be connected by braking the sun gear 102 with the aid of the servo motor 106. If, on the other hand, the annular ring gear 130 is braked with the aid of the servo motor 134, the epicyclic unit rotates backwards in relation to the driving ring wheel 100 and reverse drive is obtained on the drive shaft 78.

Figure 2:
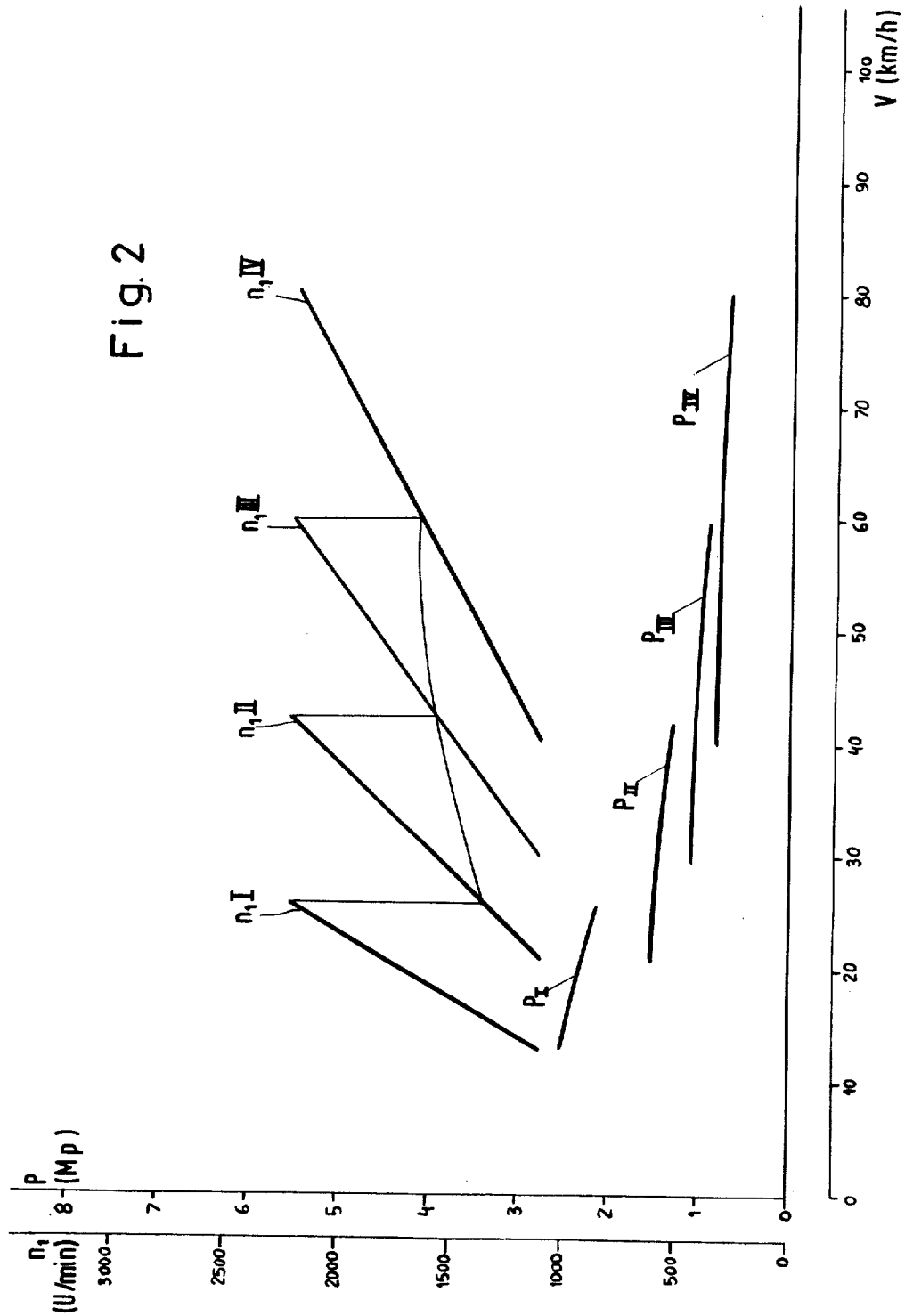
FIG. 2 is a diagram showing graphs of the engine speed, in revolutions per minute and the traction power P of a vehicle plotted against the vehicle speed in Km per hour for a drive connection as shown in FIG. 1 and in respect of the four forward speeds obtained therewith.

FIG. 2 is a diagram showing the development of the engine revolutions and the traction of the vehicle at the wheels, against the vehicle speed for the four gears designated as I-IV. The reduction ratio of the epicyclic gears given by example, are Gear I (braking 122/124 engaged): 3.2:1
Gear II (braking 114/116 engaged): 1.95:1
Gear III (braking 104/106 engaged): 1.32:1
Gear IV (clutch 142 engaged): 1:1 (Direct drive)

When reverse gear is engaged with the aid of the brakes 132, 134 the reduction in this example is 1.8:1.

FIG. 3 shows a first embodiment for the control of the different couplings and brakes with the aid of a manually operated gear lever 160 which can be moved from a neutral position into four forward gear positions for the gears 1, 2, 3, 4 (in FIG. 3) (and corresponding to I, II, III, IV in FIG. 2) and into the reverse gear position R. A gear lever 160 acting via a push rod 162 operates a multi-position control valve 164, which is fed with pressure fluid through a pipe 166.

Pressure fluid in the embodiment of FIG. 3 is obtained from a sump 172 by means of the lubricating oil pump 168 of a motor vehicle engine which is schematically shown and designated 170. The oil is sucked out of a sump 172 and is fed via a filter 174 and a non-return valve 176. Between the filter 174 and the non-return valve 176 a pipe 178 feeds fluid to a high pressure pump 180 of the relatively small capacity and driven by the rotating converter casing 10 of the hydrodynamic torque converter. The outlet of the high pressure pump 180 is connected to the inlet pipe 166 which is connected to the multi-position control valve 164. Between the inlet pipe 178 and the outlet pipe 166 of the high pressure pump a non-return valve 182 opening to the outlet pipe 166 and a maximum pressure valve 184 opening to the inlet pipe 178 are connected in parallel to one another.

Leading away from the multi-position control valve 164 and connecting the pipe 166 (according to the corresponding position of the gear lever 160) to the servo-motors 124, 116, 106, 144 and 134, there are five pipes 1, 2, 3, 4 and R, from each of which a branch pipe leads via an individually adjustable maximum pressure valve MV to a pressure-free return pipe 186, which returns to the sump 172. In FIG. 3 the five individually adjustable maximum pressure valves are bracketed together and generally designated MV for ease of reading the Figure.

In addition to leading to the high pressure pump 180, the pipe 178, which is under the pressure of the engine lubricating oil pump 168 also leads via a filter 188 to centrally located pressure inlet of a 5/3 way valve 190 (i.e. a 5 port, 3 position valve) and to two electromagnetically actuated primary valves 192, 194. Valve 190 is shown in greater detail in commonly owned U.S. application Ser. No. 549,448, filed Feb, 12, 1975. When the two primary valves 192, 194 are operated, the pressure fluid which has accumulated at the appropriate primary valve inlet, is introduced into the upper or lower control chamber of the 5/3 way valve, thereby displacing the 5/3 way valve from a central position where it shuts off the further flow of the pressure fluid into a lower or upper position respectively. In the lower position of the 5/3 way valve 190, the pressure fluid arriving through the pipe 178 is delivered via a pipe 196 to the connection 58 on the hydrodynamic torque converter whereas the connection 62 is connected via a pipe 198 with the pressure-free pipe 186, so that the coupling F for the turbine blade ring 28 is engaged. In the upper position of the 5/3 way valve 190, the connection 62 is connected via the pipe 198 with the pressure pipe 178 and on the other hand the connection 58 is connected via the pipe 196 with the pressure-free pipe 186, so that the direct coupling D is connected. Correspondingly, in the neutral position both the couplings F and D are disengaged under the effect of the leaf springs 52, 54 which centralise the friction disc 46.

As long as neither of the primary valves 192, 194 is actuated, the flow of power through the hydrodynamic torque converter is interrupted. If the upper primary control valve 192 is actuated, then hydraulic drive is connected in by the coupling of the turbine blade ring to the main drive shaft 40, and by actuating the lower primary control valve 194 direct drive connection occurs when the hydrodynamic torque converter rotates. In FIG. 3 designations D and H on lines 196 and 198, respectively accompanied by arrows indicates the direction of flow of the pressure fluid for direct and hydraulic drive respectively.

The actuation of the primary control valves 192 and 194 is accomplished electrically under control of the gear lever 160 via a 3-position switch 200, on which the gear lever 160 acts when moved about its pivotal axis. To assist understanding, the portion of FIG. 3 designated X shows the view of the gear lever taken in a direction of arrows A—A and perpendicular to its pivotal axis and from the portion X it will be seen how the gear lever 160 is guided in a slideway 202 with a generally vertical neutral position track N, from which finger-shaped, relatively long tracks 1, 2, 3, 4 corresponding to the four forward gears and a shorter track R for the reverse gear extend. In the neutral position, i.e. as long as the gear lever is located in the neutral position track N, the actuating coils of the primary control valves 192, 194 are not energised. When the gear lever 160 is put a short distance into one of the tracks 1 to 4, firstly via line Y the actuating coil of the upper primary valve 192 for hydraulic drive is energised, and then upon further movement of lever 160 to the right (as in portion X of FIG. 3) line Z is connected to actuate the coil of the lower control valve 194 for direct drive. When the lever 160 is put into the shorter reverse track R only the actuating coil of the upper primary valve 192 for hydraulic drive can be actuated.

In addition, the elctro-hydraulic control system shown also contains a valve 204 including two valve pistons separated from each other and kept at a predetermined distance by a rod rigidly fixed to one piston. The two valve pistons are pressed towards the left by a compression spring acting on the right-hand piston. In this position a pipe 206 connected into the supply 74 (FIG. 1) is, in turn, connected to the pressure fluid sump, thus forming a direct outlet pipe to the sump for the working fluid contained in the toroidal-shaped working chamber 20 of the converter. A pipe 208 which leads from the primary control valve 192 to the upper actuation side of the 5/3 way valve 190 also leads to the valve 204 at a position between the two pistons thereof. In a similar way the pipe 210 which leads from the primary control valve 194 to the lower actuation side of the 5/3 way valve 190 also leads to the left side of the left actuating piston of the valve 204. This construction enables the valve 204 to be operated so as to interrupt the connection between the toroidal-shaped working chamber of the converter 20 and the sump, via the channel 72 and between the connection 74 and the pipe 206, as well as interrupting the opening of one of the two valves 192, 194 with the aid of the manual lever 160 and the 3-position switch to connect the hydraulic drive or the direct drive.

The electro-hydraulic control shown in FIG. 3 operates as follows. Assuming that the vehicle equipped with the drive and the controls shown in FIG. 3 is stationary, with its engine idling and with the gear lever 160 located in the neutral position slot N of the slideway 202. Under these conditions the lubricating oil pump 168 is running and supplies not only the drive motor 170 with oil, but also pressurizes the pipe 178 without the pressure fluid therein, namely oil, being able to flow away.

If the driver now wishes to move his vehicle in a forwards direction he moves the gear lever 160 out of the slot N downwards to track 1 for gear 1. He thereby connects, via the multi-position control valve 164, the pipe 166 with servo-motor 124 (FIG. 1) for the first gear, which means that the sun gear 120 is firmly braked. This occurs when all parts of the planetary gearing are stationary since the friction disc 46 in the torque converter W is in its central position under the influence of the two leaf springs 52, 54 and, therefore, both the coupling F and the direct coupling D are disengaged.

When the driver moves the gear lever 160 to a position half-way along the track 1 of the slideway 202, the 3-position switch 200 closes the contact switch Y leading to the actuating coil of the primary control valve 192 to open this valve. Since at the inlet side of the valve 192 pressure builds up from the pipe 178, this is delivered to the upper actuation side of the 5/3 way valve 190 and moves this to the lower position for hydraulic drive. In this condition oil under pressure from the pipe 178 flows through the 5/3 way valve 190 to pipe 196 and from this through connection 58 and channel 56 to the front side of the friction disc 46, thus engaging the coupling F. Engagement of the coupling F results in the closure around the periphery of the friction disc flange 46A, of the space between the friction disc 46 and the turbine wheel 24. In addition, the valve 204 also seals off the pressure release of the toroidal-shaped working chamber 20 to the sump, and pressure builds up in the working chamber 20 until the maximum pressure valve 68 opens. Thus, the maximum pressure valve 68 opens. Thus, the maximum pressure valve 68, while maintaining a certain pressure in the working chamber 20 of the converter, allows the pressure fluid to flow back to the 5/3 way valve 190 through the channel 60, the connection 62 and the pipe 198 and on from there through the pressure-free pipe 186 to the sump 172. With the engagement of the coupling F the turbine blade ring 28, which is carried along by the pump blade ring 22, initially without circulation of fluid in the working chamber 20, is also braked. This initiates the circulation of the fluid in the working chamber 20, and produces a gently increasing turning moment at the turbine wheel 24, which is transmitted via the main drive shaft 40, the drive flanges 96 and 98 and the ring gear 100 to the large planet gear 86 of the epicyclic gears 84. Since the small planet gear 90 of the epicyclic gears 84 is held stationary on the inner circumference of the planetary gearing by the firmly braked sun gear 120, the turning moment which arises at the ring gear 100 is further increased at the drive shaft 78 which is connected to the epicyclic gears 84 and leads to a rapid and yet smooth moving off of the vehicle in the selected gear 1.

It is apparent that here the coupling F acts as a separating coupling, while the brake 122 has the sole function of a holding coupling for the sun gear 120. Despite this, the load on the coupling F is minimal because at the moment when coupling takes place, the fluid in the toroidal-shaped working chamber 20 is still stationary and, therefore, there is still no turning moment produced at the turbine wheel 24.

As soon as the vehicle has started to move, the gear can be changed to the next highest gear without first having to move the gear lever 160 right up to the end of the track 1 and thereby, by the releasing of coupling F and engaging the direct coupling D, connecting the direct drive. In practice, connection of the direct drive in gear 1 is much more likely to be quite unnecessary, so that the track 1 can be made as short as the reverse track R to make exclusively hydraulic drive possible.

The change to the next highest gear is carried out by moving the gear lever 160 back to the neutral position track N, thus opening the coupling F once more, and subsequently switching the multi-position control valve still further by moving the gear lever 160 into the next position in which the sun gear 112 is rigidly braked instead of the sun gear 120. As with the opening of the coupling F, the circulation of the fluid in the toroidal-shaped working chamber again increases, engagement of the brake 114 for the sun gear 112 is also achieved without a load, and with the entry of the gear lever 160 into the track 2 of the slideway 202 the coupling F is also engaged, almost without load. In this condition, the circulating flow once again builds up in the converter chamber 20 and causes the creation of a turning moment at the turbine wheel 24 which is carried via the coupling F, the main drive shaft 40, the drive flange 98 and the annular ring gear 110 to the planetary gearing and there transmitted, further increased, to the drive shaft 78.

If, for example, due to the vehicle encountering an incline or perhaps a speed limitation in local traffic, the drive speed of the vehicle produced at the change-over point of the converter is not to be further increased, the gear lever 160 can be put into the terminal position in the track 2 of the slideway 202 as required, so that the coupling F is disengaged by closing of the valve 192, and the direct coupling D is engaged in its place by actuation and opening the valve 194. When the valve 194 is opened, the 5/3 way valve 190 is moved into the upper terminal position and the pressure fluid, which builds up at the inlet of the 5/3 way valve, flows through the pipe 198, the connection 62 and the channel 60 to the rear side of the friction disc 46 so that the flange 46A engages the conical insert 48 of the converter casing 10. The seal thus created between the friction disc flange 46A and the conical insert 48 prevents flow round the periphery of the friction disc flange 46A and leads to the building-up of pressure on the rear side of the friction disc 46 of the appropriate holding force for the direct coupling D until the maximum pressure valve 70 opens and, while maintaining a sufficiently great pressure difference, allows the pressure fluid to flow away through the channel 56 and the connection 58 as well as the pipe 196 to the 5/3 way valve 190 and further on through the pressure-free pipe 186 to the sump 172.

If, on the other hand, the vehicle is to be accelerated further after reaching the change-over or shift point in the torque converter, the gear lever 160 is brought back into the neutral position track N of the slideway 202 and the multi-position control valve 164 is brought into the next position in which the sun gear 102 is made stationary instead of the sun gear 112. In this condition the gear lever 160 is moved into the position for hydraulic drive (i.e. into the track 3), the coupling F is first opened and then re-engaged so that the smallest reduction in the planetary gearing is introduced into the drive line and the converter again increases the turning moment.

A change into gear IV is carried out in a similar way but, instead of the braking of the sun gear 102, the direct coupling clutch 142 in the planetary gearing is actuated. When the direct drive coupling is so actuated and connected, and the gear lever 160 is in the position 4, the torque converter again first undertakes multiplication of the turning moment until the shift point is reached, whereupon the gear lever 160 is moved into the terminal position in the track 4 and the direct drive coupling D is connected into the drive line. In this position the entire drive connection from the converter casing 10, which forms the input component, up to the drive shaft 78 is then directly and mechanically connected right through the transmission and, in this condition the hydrodynamic torque converter and the planetary gearing are disconnected.

The above description of the connection of all stages of the planetary gearing in conjunction with hydraulic drive in the converter part W is normally only required when particularly high traction power is required either for the acceleration of the vehicle with a heavy load due to the actual load carried, or on inclines. With more lightly loaded goods vehicles and personnel transporters, on the other hand, one to two of the intermediate gears, such as for example gears I and III, can be omitted. Consequently, direct drive is only connected in the lower gears if the vehicle is to be driven for a long time in these gears at correspondingly lower speeds in the most favorable working range of the drive motor.

It will be self-evident from the foregoing that the connection of the reverse gear is carried out in a similar manner. Since the reverse gear is connected only for short periods and over short distances, it is never necessary to engage direct drive (with consequent by-passing of the hydrodynamic torque converter) so that the track R in the slideway 202 can always be a relatively short track.

The control system shown in FIG. 4 is different from that in FIG. 3 only in that, instead of the lubricating oil pump of the drive motor, the hydrodynamic torque converter filling pump (reference 310 in FIG. 4), produces the basic pressure for the control system. The filling pump 310 sucks fluid out of the sump 312 of the converter. The pressure pipe of the filling pump 310 corresponds to the pipe 178 in FIG. 3 and is therefore also given the reference 178. In other respects the control system shown in FIG. 4 is identical to that in FIG. 3, and therefore functions in the same way.

It will be understood that, as long as the multi-position control valve 164 remains in the neutral position in which all outlets 1 to 4 and R are closed, that a pressure build-up will occur in the inlet pipe 166 to this valve due to operation of the filling pump 310 or operation of the lubricating oil pump 168 (FIG. 3) and the subsequently connected high pressure pump 180 and that the build-up is limited to a specific maximum value by the maximum pressure valve 184. As soon as the multi-position control valve 164 is switched to connect the pipe 166 with one of the controls servos for the brakes or couplings of the planetary gearing, the pressure will momentarily drop and with the rotation of the high pressure pump 180, the filling pump 310 or the lubricating oil pump 168, pressure fluid is supplied under comparatively low pressure through the non-return valve 182 directly to the servo-motor to which it is connected. The so connected servo-motor is, therefore, rapidly filled by virtue of the high capacity of the filling or lubricating oil pump, and the relevant brake or coupling is rapidly engaged with comparatively low power. As soon as this filling is completed and when, therefore, no further fluid replenishment is required by the filling or lubricating oil pump through the non-return valve 182 and the pipe 166, the pressure in the pipe 166 rises again and closes the non-return valve 182. This allows the high pressure pump 180 to still further increase the pressure in the pipe 166 and provides the ultimate pressure required to hold the brakes and couplings in engagement.

The level of this pressure is finally individually limited by the maximum pressure valves MV associated with each individual servo-motor and the individual valves are adjusted so that the associated servo-motor operates at the pressure required to hold the relevant brake or coupling.

The control system as shown in FIG. 5 differs from that shown in FIG. 4 only in that the multi-position control valve 164 has four outlets, and the slideway has only three forward tracks 1, 2 and 3. In the position 3 the pipe 166 is connected by a pipe 313 to a change-over valve 314 which is constructed as a 4/2 way valve, i.e. a 4 port, 2 position valve. The two outlets of the change-over valve 314 lead to the servo-motors 106 and 124 for gears III and IV (FIG. 1), and the other inlet of the valve 314 is connected to the torque converter sump.

With the switching over of the valve, which can be carried out electrically, hydraulically or pneumatically depending on certain parameters such as, for example, the number of revolutions of the engine or perhaps the position of the accelerator pedal, in position 3 of the multi-position control valve 164 either the servo-motor 106 is connected to the pressure pipe 166 and the servo-motor 124 released (gear III) or, the servo-motor 124 is connected to the pressure pipe 166 and the servo-motor 106 released (gear IV). With the aid of this change-over valve the driver can, for example, sometimes be spared from changing the position of the gear lever 160 when a reduction in the speed makes travel in gear III instead of gear IV desirable with regard to the efficiency of the engine. Further, at higher travelling speeds, a higher turning moment can momentarily be made available by pressing the accelerator pedal right down to produce so-called "kick down".

The description of the control system according to FIGS. 3 to 5 is carried out in conjunction with the drive connection shown in FIG. 1, the torque converter part W of which contains a one and a half stage hydrodynamic torque converter with release coupling for the turbine and with direct coupling, which can be connected alternately. It will be apparent, however, that the control systems shown and described can be used in conjunction with other drive connections which, for example, have only one mechanical drive in conjunction with a separating coupling of conventional design, which is open when the gear lever 160 is in the neutral position track. In this case, naturally the whole valve complex which is encircled in dashes in FIGS. 3, 4 and 5, is replaced by a simple actuation valve for the separating coupling, which can if desired, also be changed electromagnetically by a switch operated by the gear lever, similar to the 3-position switch 200.

The control systems shown and described can, however, also easily be adapted to drive connections with other hydrodynamic torque converters, which do not contain any releasable bladed component. Such a drive connection is shown in FIG. 6 and, although the mechanical gear M is the same as that of the drive connection of FIG. 1, the torque converter of the drive shown in FIG. 6 contains a two-stage hydrodynamic torque converter with a direct coupling D between the converter housing 416, which forms the input component and a main drive shaft 48 which corresponds to the main drive shaft 40 in FIG. 1, A turbine wheel 420 having two turbine blade rings T1 and T2 is non-rotatably carried by the drive shaft 418 and a ring of guide blades L is disposed between the turbine rings T1 and T2. The guide ring L is supported on an impeller wheel 422 which, in turn, is supported on an impeller wheel shaft 424 which is rotatably mounted in the converter housing and encloses the main drive shaft 418 as a hollow shaft. A multiple disc brake 426 enables the impeller wheel 422/shaft 424 to be locked with the non-rotatable housing.

Due to the lack of a release coupling as well as a special spearating coupling, in the drive connection shown in FIG. 6 the braking or coupling of the individual parts of the planetary gearing is carried out under load. Thus the brake and the direct coupling operate not only as holding couplings, but also as separating couplings or clutches and, consequently, are generally constructed with more braking and coupling discs. A certain amount of relief for these brakes and this coupling during a change can, however, be achieved by releasing the impeller wheel brake 416 during the change-over process so that the hydrodynamic torque converter does not bear the full turning moment.

the adaptation of the control systems shown in FIGS. 3 to 5 can then be achieved in that the gear lever 160 is equipped with a 3-position switch which in the position H opens a valve to connect the servo-motor of the impeller wheel brake 426 and in the position D opens a further valve through which the front face of an actuating piston 428 for the direct coupling D formed as a disc clutch is supplied.

Although the invention has been described in considerable detail with respect to preferred embodiments thereof, it will be apparent that the invention is capable of numerous modifications and variations apparent to those skilled in the art, without departing from the spirit and scope of the invention, as defined in the claims.

We claim:

1. A variable power transmission for motor vehicles comprising:
    a multi-speed planetary gear having primary and secondary shafts journalled with respect to a casing, a planet carrier drivingly engaged with one of said shafts, planet gears rotatively mounted on the planet carrier and having at least two sections of different diameter, at least three annular gears, each engagable with one of the planet gear sections, such that each gear section has at least one annular gear engaged therewith, one of the annular gears being a drive annular gear engaged with a second of said shafts, a friction coupling means for holding each of the annular gears stationary relative to the casing, and a servo-motor non-rotatively mounted in the casing for operating each of said friction coupling means,
    a multi-position control valve for selectively controlling operation of individual ones of said servo-motors to in turn engage their respective friction couplings, a fluid source including a low pressure, high capacity pump, first and second fluid circuits connected in parallel between the fluid source and the multi-position control valve, the first fluid circuit including a low capacity, high pressure pump, and the second fluid circuit including a one-way check valve openable for delivering fluid into the first circuit between the low capacity, high pressure pump and the multi-position control valve for delivering fluid to said multi-position control valve, whereby fluid for delivery to the multi-piston control valve is delivered first through the said one-way check valve, afterwhich pressure thus built up is held by the low capacity, high pressure pump.

2. A transmission device as in claim 1, wherein each servo-motor is connected via an associated maximum pressure one-way valve to a pressure-free return line and wherein the pressure at which each maximum pressure valve opens is individually adjustable independently of the other maximum pressure valves.

3. A transmission according to claim 1, wherein the fluid source is the fluid within the transmission.

4. A transmission according to claim 1, including a separating coupling for breaking the drive between the drive motor of the vehicle and the planetary gearing.

5. A transmission according to claim 1, including a hydrodynamic torque converter in the drive line between the drive motor of the vehicle and the planetary gearing.

6. A transmission according to claim 5, wherein the torque converter includes a releasable bladed torque transmitting component in the drive line from the vehicle motor to the planetary gear.

7. A transmission according to claim 6, wherein the torque converter includes a direct drive coupling.

8. A transmission according to claim 1, wherein the multi-position control valve is manually operable by means of a lever which is movable in a slideway.

9. A transmission according to claim 8, wherein the slideway has a neutral position track with finger-shaped tracks leading from it for the individual gear steps of the gear change.

10. A transmission according to claim 9, including a separating coupling for breaking the drive between the drive motor of the vehicle and the planetary gearing, including a change-over device for the operation of the separating coupling, wherein the change-over device opens when the multi-position control valve is in a position which corresponds to the neutral position.

11. A transmission according to claim 9, including a hydrodynamic torque converter in the drive line between the drive motor of the vehicle and the planetary gearing, and wherein the slideway includes an area designated for hydraulic drive and disposed in a position adjacent to the neutral track.

12. A transmission according to claim 11, wherein the slideway further includes an area designated for direct drive.

13. A transmission device according to claim 11, including a change-over valve at one outlet of the multi-position control valve for automatic change-over between at least the two highest gears under certain driving conditions.

14. A transmission according to claim 1, said planet gears including at least three sections of different diameters, said planetary gear including four forward and one reverse drive steps.

15. A transmission according to claim 1, including a torque converter in the drive line between the vehicle motor and the planetary gear, said torque converter having a releasable bladed torque transmitting component movable to a first position for hydraulic drive and a second position for direct drive, and a neutral position therebetween, a valve device for controlling the operation of the torque converter, said valve device being operable in response to movement of the said control device.

16. A transmission according to claim 15, said control device being of the type having an elongated element movable one way to provide hydraulic drive and another way for direct drive, electromagnetically operated control devices for controlling operation of the elongated element, said electromagnetically operated control devices being operable in response to operation of the said control valve.

17. A variable power transmission comprising:
a torque converter operatively engagable with a vehicle motor and having a releasable torque transmitting bladed component movable between a hydraulic drive position and a direct drive position and a neutral position,
a multi-speed planetary gear having an input connected to the torque converter output, said planetary gear including planet gears having more than one section of different diameters, and an annular gear engaging each of said sections, friction couplings for holding each of said annular gears stationary, each under the action of a servo-motor non-rotatively mounted in a stationary portion of the casing,
a control valve having a plurality of different gear step positions, one gear step position for controlling the flow of pressurized fluid to each of said servo-motors, a lever means for operating the control valve, said lever means being movable to a plurality of different gear step positions, one gear step position for each of said control valve gear step positions, and said lever means being operable in each of its gear step positions to close the control valve or open it for fluid flow to the respective servo-motor of that gear step position,
a control device for controlling the engagement and disengagement of the releasable bladed component, said control device being operable, in response to movement of the lever means within each of its gear step positions, to selectively release the releasable bladed component when the control valve is closed or cause driving engagement of the releasable bladed component as the lever means is moved to open the control valve in that gear step position.

18. A variable power transmission according to claim 17, said control device including an elongated valve movable between a central position for neutral releasing of the releasable bladed component and opposite end positions for hydraulic drive and direct drive, and movement of the lever means within a gear step being operable to move the elongated element between its different positions.

19. A variable power transmission according to claim 18, said lever means being a manually operable lever, and said control device including an elongated slot for the neutral released position of the releasable bladed component and a further slot perpendicular thereto for each of said gear steps, and said elongated valve element being movable to different of its positions as the manual lever moves to different points along each of said further slots.

* * * * *